United States Patent

Kunig et al.

[11] Patent Number: 5,372,539
[45] Date of Patent: Dec. 13, 1994

[54] METHOD FOR MECHANICALLY GAINING FILLET FROM POULTRY CARCASSES AND AN APPARATUS FOR CARRYING OUT THE METHOD

[75] Inventors: Helmut Kunig, Bad Schwartau; Andreas Landt; Sigurd Richartz, both of Lübeck; Matthias Schröder, Bad Schwartau, all of Germany

[73] Assignee: Nordischer Maschinenbau Rud. Baader GmbH & Co. KG, Lubeck, Germany

[21] Appl. No.: 134,607

[22] Filed: Oct. 12, 1993

[30] Foreign Application Priority Data

Oct. 9, 1992 [DE] Germany ............... 4234040

[51] Int. Cl.⁵ ............................................. A22C 21/00
[52] U.S. Cl. .................................... 452/136; 452/135; 452/165; 452/161
[58] Field of Search ............. 452/136, 135, 149, 151, 452/161, 165, 170

[56] References Cited

U.S. PATENT DOCUMENTS

| | | | |
|---|---|---|---|
| 4,827,570 | 5/1989 | Scheier et al. | 452/136 |
| 4,993,114 | 2/1991 | Meyer et al. | 452/136 |
| 5,098,337 | 3/1992 | Landt et al. | 452/136 |
| 5,269,722 | 12/1993 | Dresing et al. | 452/135 |

FOREIGN PATENT DOCUMENTS 380714  1/1989  European Pat. Off. .

Primary Examiner—Willis Little
Attorney, Agent, or Firm—Fay, Sharpe, Beall, Fagan, Minnich & McKee

[57] ABSTRACT

In a method for mechanically gaining flesh from poultry bodies and an apparatus for carrying out this method, a series of tools are employed that are arranged along a conveyor (1) which has supporting elements (4) for supporting poultry bodies (58). These tools are formed with the aim of achieving a high quality end product at a high yield that is appealing to the eye. The processing of the poultry bodies (58), which are conveyed and securely held by the supporting elements (4), is performed sequentially using controllable scraping elements, stop elements, scraping blades, knives and strippers which loosen the connection between the skeleton (69) and the fillet flesh in a specific order.

27 Claims, 3 Drawing Sheets

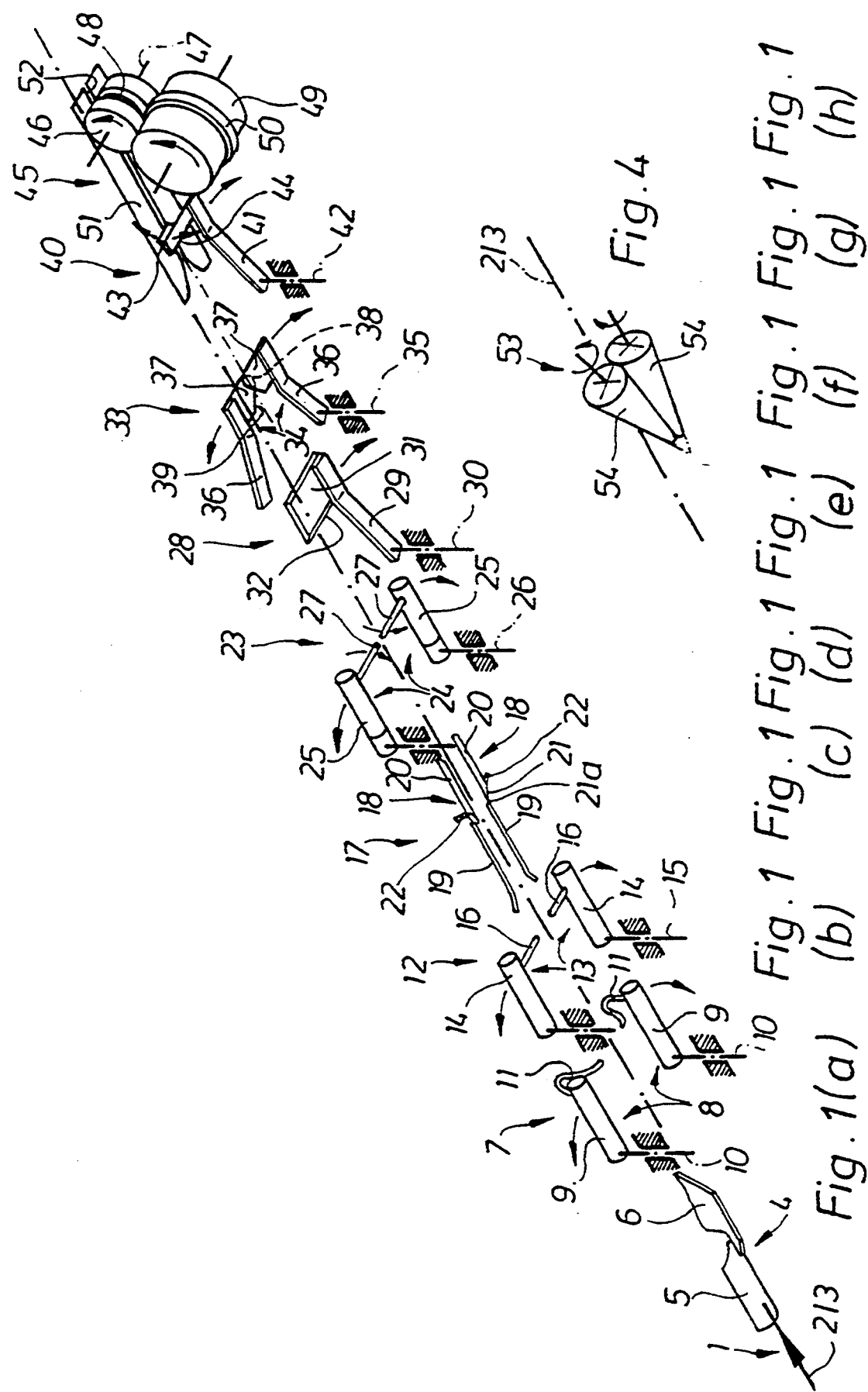

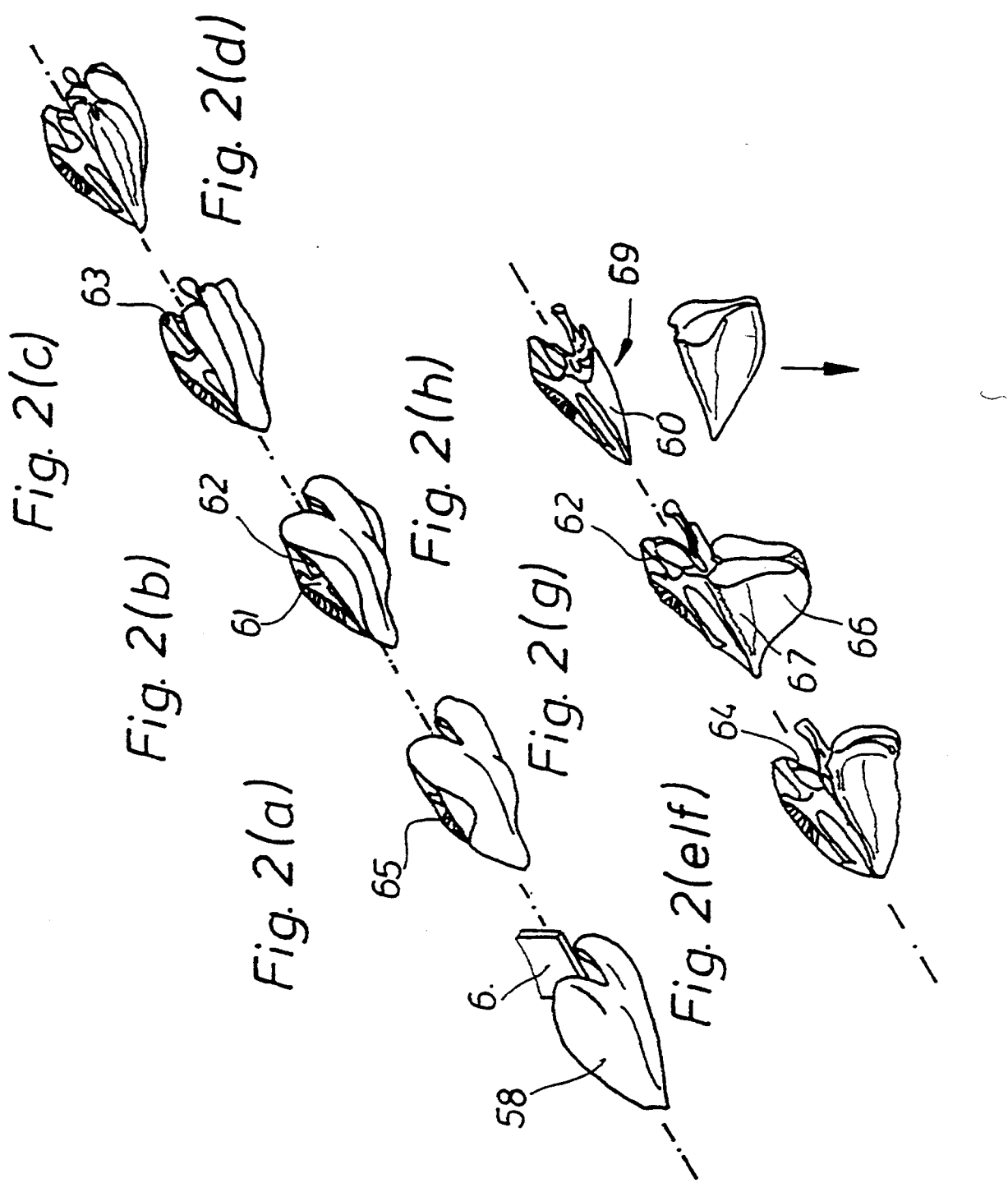

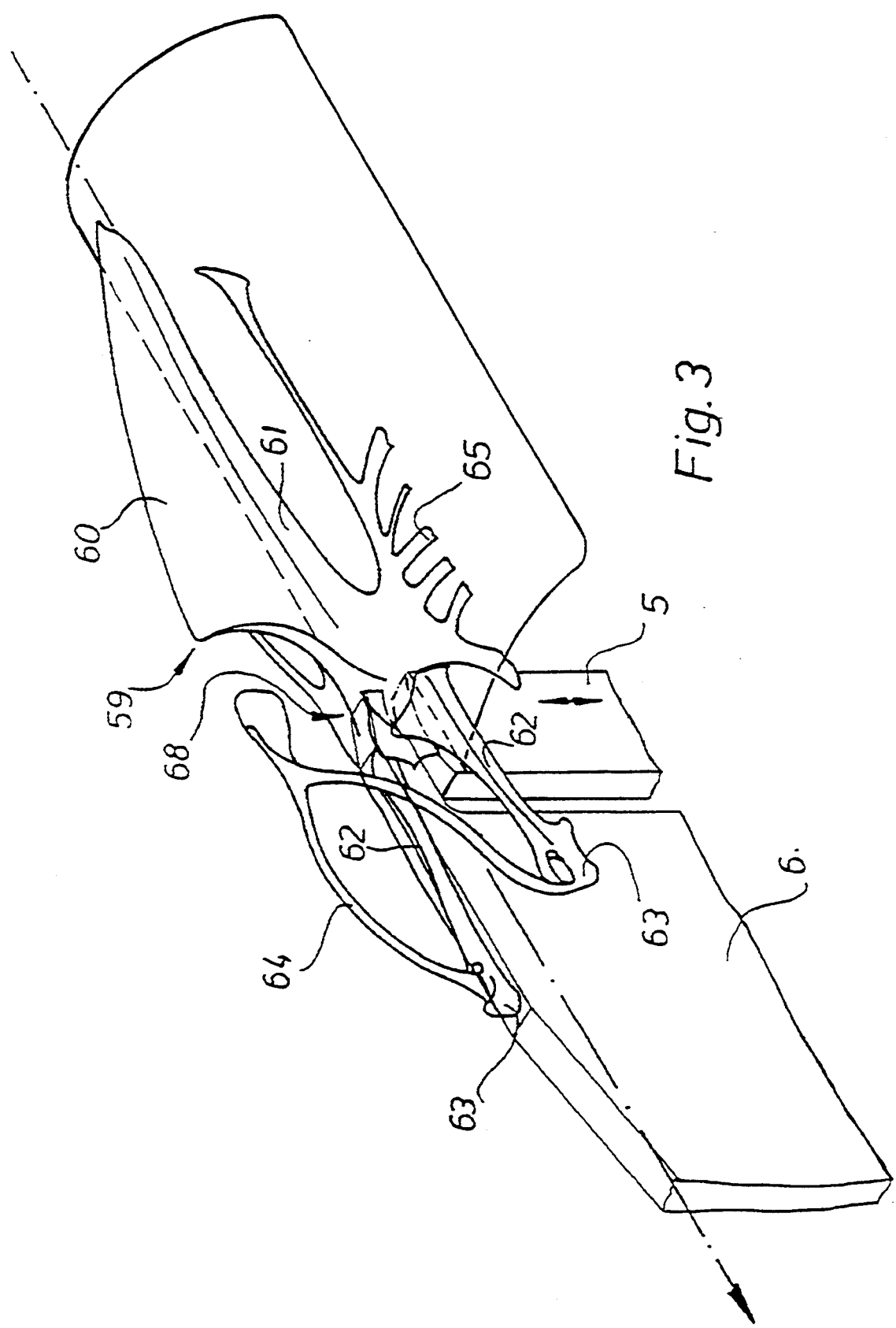

METHOD FOR MECHANICALLY GAINING FILLET FROM POULTRY CARCASSES AND AN APPARATUS FOR CARRYING OUT THE METHOD

BACKGROUND OF THE INVENTION

1. Field of the Invention

The invention concerns a method for mechanically gaining fillet from the bodies of slaughtered poultry, from which the extremities have been removed and of which the skeletal portion to be processed essentially comprises a breastbone (sternum) including the crest (crista sterni) and breastbone plate (corpus sterni), the wing joints and wishbone (clavicula) both held by the coracoids (coracoidae), and possibly the remains of the ribs, the poultry body being held and moved in the direction of its longitudinal axis with the wing joints forward, as well as an apparatus for carrying out the method having a conveyor with receptacles or supporting elements equipped with a saddle surface for supporting the poultry body on the inner surface of the breastbone and with a controllable clamping element for fixing the poultry body, and having processing tools arranged along the path of the conveyor and a control mechanism for time and spatial control of the processes.

2. Prior Art

The document EP-B1-0 380 714 discloses a method of this type and an apparatus for carrying out this method. The method is characterized by a sequence of method steps which, when applied in the given order, are intended to allow the flesh from poultry bodies to be reclaimed in the form of double (breast) fillets with or without inner fillets. Associated with this are provided correspondingly adapted processing tools, arranged along the length of the path of the conveyor with supporting elements for supporting the poultry bodies to be processed and controllable in synchronization with the forward movement of the supporting elements.

Practical application has shown that on employing the given succession of method steps, a satisfactory result with regard to yield, appearance and, in particular, securely attached inner fillets is not achievable. An analysis of the causes shows that essentially undefined tearing processes, which damage both the flesh structure and the natural connection between the inner and main fillets lead to this result.

OBJECTS OF THE INVENTION

It is an object of the invention to provide a method and apparatus for gaining flesh from poultry bodies which alleviate the disadvantages of the prior art methods and apparatus.

It is a further object of the invention to provide a method and apparatus by means of which an optically appealing product can be achieved at high yield.

It is a further important object of the invention to provide a method and apparatus for obtaining a product in which the inner fillets remain firmly attached to the main fillet.

SUMMARY OF THE INVENTION

In a method for mechanically gaining fillet from the bodies of slaughtered poultry, from which the extremities have been removed and of which the skeleton portion essentially comprises a breastbone (sternum) consisting of the crest and breastbone plate, the wing joints and wishbone (clavicula) held by the coracoids, and possibly the remains of the ribs, the poultry body being held and moved in the direction of its longitudinal axis with the wing joints forward, this object is achieved according to the present invention by the following sequential steps, which are performed to both sides of the poultry body symmetrically:

a) lifting the flesh parts lying on the breastbone plate in the region of attachment of the ribs and on any rib remains, b) detaching the flesh parts lying on the coracoids in the region between the wing joints and the points of attachment of the coracoids to the breastbone plate by detaching the wing tendons running through the inner fillet portion as well as loosening flesh parts lying on the breastbone plate by continuing the seperation process of step a) up to the vicinity of the crest of the breastbone, c) separating the connection between the flesh and the skeleton in the region of attachment of the wishbone to the coracoids, d) lifting the flesh parts lying on the breastbone plate in the valley region between said breastbone plate and the crest of the breastbone by continuing the separation process of step b) in the breastbone region, e) detaching/loosening the flesh parts lying on the wishbone, f) cutting into the connecting skin, particularly that connecting the inner fillet portion to the breastbone, g) separating the connections between fillet flesh and breastbone in the frontal area and neighbouring crest area, h) completely detaching the fillet flesh from the crest of the breastbone.

In an apparatus for mechanically gaining fillet meat from the bodies of slaughtered poultry of the type described above, having a conveyor with a supporting element equipped with a saddle surface for supporting the poultry body on the inner surface of the breastbone and with a controllable clamping element for fixing the poultry body, and having processing tools arranged along the path of the conveyor and a control mechanism for time and spatial control of the processes, this object is achieved according to the invention by providing processing tools for carrying out steps a) to h) of the method.

The advantages associated with this method and apparatus are, in particular, that due to the specific distinctive detachment of the flesh from the skeleton with respect to the inner and outer fillet portions and their position on the skeleton, gentle processing, i.e. separation of flesh from the skeleton with regard to the extremely sensitive connection between the inner and outer fillet portions, is possible. In this way, these connective areas are not unduly strained and the fillets remain whole and thus definitely include the inner fillet portion as well as the main fillet portion, in contrast to the process of EP-B1-0 380 714 which involves undefined tearing.

BRIEF DESCRIPTION OF THE DRAWINGS

Other and further objects of the present invention will be apparent from the following description and claims and are illustrated in the accompanying drawings which by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIGS. 1(a–h) show a simplified overall representation of the apparatus according to the invention, axonometrically represented and viewed from below, FIGS. 2(a–h) show axonometric representations of a poultry body prepared for processing according to the invention at each of the processing stages, after carrying out method steps a) to h) respectively, FIG. 3 shows an axonometric representation of the skeleton body of a breast part of a poultry body mounted on the saddle, and FIG. 4 shows a simplified view of a skinning tool, represented axonometrically and viewed from below.

DETAILED DESCRIPTION OF THE PREFERRED EMBODIMENTS

The apparatus according to the invention is mounted on a machine frame which is not represented for reasons of clarity, and comprises a number of processing tools, which are arranged along the lower run 2 of a conveyor 1 as shown in FIG. 1. The conveyor comprises an endless, driven chain 3, of which only the lower run 2 is shown, which rotates in a vertical plane in an appropriate manner and is equipped with supporting elements or receptacles 4 for holding the poultry bodies 58 to be processed. The supporting elements 4 each comprise a saddle portion 5, which together with a clamping portion 6, forms a pincer-like clamp that is controllable along non represented cam rails attached to the frame and which, shortly before the supporting element 4 enters the region of the processing tools, is brought into its closed position by lifting the saddle portion 5 such that it holds the poultry body 58 positioned and orientated as shown in FIG. 3.

A first processing tool 7 (FIG. 1a) comprises of a pair of tool parts 8, arranged symmetrically on either side of the path of the supporting elements 4, each comprising a supporting arm 9 pivotably mounted on a vertical axis 10 and carrying a finger-shaped scraping element 11 at its free end. The active part of the finger-shaped scraping element 11 is formed curved such that it corresponds to the arched form of the area to be processed and is controllably movable by means of a control device, which is not shown, between a position outside the path of the poultry bodies and a position lying across the path of the poultry bodies on being pivoted about the axis 10 by means of appropriate driving means.

The controlling is adapted to be dependent on the product by the use of a feeler element which is not shown, so that each activation of the tool parts 8 is effected according to the size of the product.

The first processing tool 7 is followed by a second processing tool 12 (FIG. 1b), which is arranged in a similar manner to the first 7 and is controllable in a similar way. This comprises of a pair of tool parts 13 each with a supporting arm 14 pivotably mounted on an axis 15. Each supporting arm 14 carries a finger-shaped scraping element 16 on its free end whereby both scraping elements 16 lie in a common plane defined by the position of the ends of the scraping elements 11 of the first processing tool's 7 tool parts 8.

The second processing tool 12 is adjoined to a third processing tool 17 (FIG. 1c), in whose region a pair of parallel guide rods 19 are arranged symmetrically on both sides of the path of the supporting elements 4 in a plane corresponding to that defined by the previous tools. The processing tool 17 comprises a pair of tool parts 18 attached to the frame and formed as parallel guide rods 20. These guide rods 20 lie in a plane which is spaced at a larger distance from the path of the supporting elements than the plane of the guide rods 19. The ends of the guide rods 20 pointing against the direction of movement of the conveyor are designed as deflectors 21 formed from an end face cut diagonally, whereby the resulting points are formed by an extension of the inner flank of each guide rod 20. Each of the guide rods 20 is further provided with stop means 22 arranged near the deflector 21 and projecting laterally from the guide rods 20.

The guide rods 20 lead into the region of a fourth processing tool 23 (FIG. 1d), which is arranged in a manner similar to the first and second tools (7 and 12 respectively). The controlling is effected by a cam drive not shown in the drawings which is synchronized with the conveyor 1. The processing tool 23 comprises a pair of tool parts 24 each with a supporting arm 25 pivotably mounted on an axis 26. Each supporting arm 25 carries a finger-shaped scraping element 27 at its free end, whereby said scraping elements 27 lie in a common plane defined by the position of the ends of the scraping elements 11 of the tool parts 8 and the scraping elements 16 of the tool parts 13. The scraping elements 27 are arranged perpendicular to the path of the support elements 4 and resiliently yieldable with respect to the same, e.g. spring loaded.

The succession of processing tools continues with a fifth processing tool 28 (FIG. 1e), which comprises a pivotable supporting arm 29 mounted on a vertical axis 30 and arranged on one side of the path of the supporting elements and adjacent the same, and a scraping blade 31 attached at the free end of said supporting arm 29. The scraping blade 31 comprises a scraping edge 32 which, on pivoting the supporting arm 29, is swingable between a position lying outside the path of the poultry bodies and a position lying across the path of the poultry bodies. The scraping edge 32 extends in a plane that essentially corresponds to that in which the guide rods 20 of the third processing tool 17 extend.

A sixth processing tool 33 follows the fifth processing tool 28 (FIG. 1f) and comprises of a pair of tool parts 34, each one comprising a pivotable supporting arm 36 mounted on a vertical axis 35, and a knife blade 37, attached to the free end of said supporting arm 36. The two knife blades 37 are mirror inverted and arranged to scissor or shear with one another in their active position. The blades are essentially triangular-shaped and are arranged such that each has a triangle point 38 directed towards the other and that in the active position they overlap in this region. The triangle point 38 and the edges leading off this form cutting edges 39. On swinging the supporting arm 36, the knife blades 37 are swingable between a position lying outside the path of the poultry bodies and the above mentioned active position, in which the knife blades 37 take on the described shearing position. The tool parts 34 are spring loaded in the active position and the knife blades 37 are arranged in a plane that lies a little above the working plane of the processing tool 28.

The processing tool 33 is adjoined to a seventh processing tool 40 (FIG. 1g), which comprises a supporting arm 41 arranged on one side of the path of the supporting elements 4, pivotably mounted on a vertical axis 42 and having a stop element 43 fixed to its free end. The stop element 43 comprises a stop face 44 which, on swinging the supporting arm 41, is swingable between a position lying outside the path of the poultry bodies 58 and a position lying across this path. The stop face 44 is located in a plane extending directly over the path of the skeleton bodies 69. The stop element 43 is arranged to be resiliently vertically yielding.

Finally, an eighth processing tool 45 is provided (FIG. 1h) which comprises a scraper or stripper roller 46 rotatably driven on an axis 47 arranged transverse to the path of the supporting elements 4. The part of the stripper roller surface which is directed towards the path of the supporting elements is essentially tangential to the working plane of the knife blades 37 of the sixth processing tool 33, and the stripper roller 46 rotates against the direction of movement of the poultry bodies 58. A guide groove 48 is disposed on the stripper roller 46 and situated in the plane of symmetry of the conveyor 1. A deflection roller 49, which turns in the same sense as the stripper roller 46, engages with said guide groove 48 on the side opposing the path of the supporting elements 4 by means of a radial ridge 50 located on said roller 46. In the region of the seventh and eighth processing tools (40 and 45 respectively), two frame-fixed guides 51 are arranged which have a slit 52 between them for guiding the crest 60 of the breastbone 59 and which are arranged roughly tangential to the stripper roller 46.

The function of the apparatus will be described in the following using the passage of a poultry carcass 58 prepared as described in the introduction by way of example.

The poultry body 58 to be processed is held ready immediately after the passage of the supporting element 4 through the non-shown feeding area of the upper run of the conveyor 1. The body 58 is held with the breastbone 59 pointing upwards and the wing joints 63 forwards. On the arrival of a supporting element 4 the poultry body 58 is placed on its saddle portion 5, such that the inner side of the breastbone plate 61 rests on the saddle surface. The poultry body 58 is then pushed against the clamping portion 6 so that the backward pointing beak-like extension of said clamping portion abuts against the breastbone plate 61 at the part where the crest 60 is located, and grips the same from above through the arch of the wishbone 64. In the mean time, the supporting element 4 will have approached the deflection of the conveyor 1 into the lower run 2, so that the saddle portion 5 of the supporting element 4 is raised on running onto a cam rail not shown in the drawings, and the poultry body 58 is thus clamped at the clamping point 68. The securely held and positioned poultry body 58 thus arrives in the region of the first processing tool 7 (FIG. 1a).

Immediately after the wing joints 63 have passed by, the tool parts 8 of the first processing tool 7 are controlled to move into the path of the poultry bodies 58 until the scraping elements 11 rest on the rib remains or on the outermost part of the breastbone plate 61 and lift off the flesh lying thereon according to FIG. 2a) so that these flesh parts hang down under the force of gravity.

The poultry body 58 then arrives in the region of the second processing tool 12, of which the tool parts 13 are also activated immediately after the wing joints 63 have passed by, so that the scraping elements 16 penetrate into the separation slits formed by the scraping elements 11 and, on sliding along the coracoids 62 and subsequently the breastbone plate 61 near to the crest 60 of the breastbone 59, lift off the flesh parts lying thereon (FIG. 2b).

On continuing downstream the conveyor, the pair of guide rods 19 penetrates into the separation slits and have the effect that the coracoids 64 are guided and held down on the saddle portion 5 of the supporting element 4. In this position, the poultry body 58 reaches the third processing tool 17, of which the guide rods 20 penetrate into the flesh immediately adjacent the coracoids 64 and above the wing joints 63 with their points 21a. In doing this, the deflectors 21 push the detached flesh parts outwards into the region of the stop means 22, which in turn hold back the flesh thus causing the latter to be torn away from the skeleton around the wing joints 63 when the poultry body proceeds further (FIG. 2c).

Following this, the scraping elements 27 of the fourth processing tool 23 are swung into the path of the poultry bodies immediately before the arrival of the breastbone 59, whereby they continue the detachment of flesh parts from the breastbone plate 61 begun in the method steps a) and b), up to the valley region between the plate 61 and the crest 60 of the breastbone 59 (FIG. 2d).

The flesh portions lying on the wishbone 64 are then lifted by means of the scraping blades 31 of the fifth processing tool 28 which is controlled to move into the path of the poultry bodies 58 and then to move out again shortly before the arrival of the breastbone 59. The scraping of the flesh is performed while pressing the wishbone 64 against the coracoids 62.

The connecting skin, which connects in particular the inner fillet portion 67 to the breastbone 59 and which holds under tension the downward hanging flesh parts already detached around the crest 60 of the breastbone 59, is then cut. This is achieved by controlling the knife blades 37 of the sixth processing tool 33 to move into the path of the conveyor before a poultry body 58 arrives, so that the said skin enters the shearing region of the knife blades 37 and is cut. When the crest 60 of the breastbone 59 arrives in the shearing region, the knife blades are forced apart, so that their cutting edges 39 are supported against the flanks of the crest 60 of the breastbone and, spring loaded, slide along them. The controlled movement of the knife blades 37 out of the path of the poultry, occurs shortly after the arrival of the crest 60 in the shearing region (FIG. 2e/f).

In order to release the firm connection of the flesh in the frontal and crest regions of the breastbone 59, the stop element 43 of the seventh processing tool 40 is controlled to move into the path of a poultry body 58 shortly before the latter arrives and held in this position until shortly after the front part of the crest 60 of the breastbone 59 has passed by. Consequently, the flesh is briefly held back so that the above mentioned connection is torn apart (FIG. 2g).

The remaining connection between skeleton 69 and flesh is finally broken by a stripper roller 46, which strips off the whole flesh, comprising the main fillet 66 and inner fillet 67, from the crest 60 of the breastbone 59, on only slightly straining it, this process being aided by the deflection roller 49 (FIG. 2h).

After this, the clamping hold applied by the supporting element 4 is loosened and the flesh freed from the skeletal body 69 is released.

At the start of the whole process, a skinning step can be provided which can be carried out by a skinning tool 53 corresponding to that shown in FIG. 4. This is achieved by bringing the circumferential surfaces of a pair of rollers 54 into contact with the poultry body 58 whereby the rollers rotate in opposite senses and together form a clamping slit, so that the skin is drawn into the clamping slit and thereby gripped and pulled off.

We claim:

1. A method for mechanically gaining fillet flesh from the bodies of slaughtered poultry, said poultry body defining a longitudinal axis and an exterior sectional contour and having a skeletal portion and skin and fillet flesh parts lying on and being connected to said skeletal portion, said skeletal portion essentially comprising a breastbone (sternum) including a crest (crista sterni) and a breastbone plate (corpus sterni), and defining a frontal area and inner surface, coracoids, each defining two ends and being attached to said breastbone plate at one of said ends, and wing joints and wishbone (clavicula) carried on said other ends of said coracoids, and possibly the remains of the ribs attached to said breastbone plate, said fillet flesh parts including an inner fillet portion which has wing tendons running through it, and comprising connecting skin connecting said inner fillet portion to said breastbone, said poultry body being held and conveyed in the direction of its longitudinal axis with the wing joints leading, said method comprising the following sequence of procedural steps, which are performed to both sides of the poultry body essentially symmetrically:
   a) lifting the flesh parts lying on said breastbone plate in the region of attachment of the ribs and on any rib remains,
   b) detaching the flesh parts lying on said coracoids in the region between said wing joints and the points of attachment of said coracoids to said breastbone plate by detaching said wing tendons running through said inner fillet portion as well as loosening flesh parts lying on said breastbone plate by continuing the seperation process of step a) up to the vicinity of said crest of the breastbone,
   c) separating the connection between the flesh and said skeletal portion in the region of attachment of said wishbone to said coracoids,
   d) lifting the flesh parts lying on said breastbone plate in a valley region formed between said breastbone plate and said crest by continuing the separation process of step b) in the region of said breastbone,
   e) loosening the flesh parts lying on said wishbone,
   f) cutting into said connecting skin connecting said inner fillet portion to said breastbone,
   g) separating the fillet flesh from said breastbone in said frontal area and neighbouring crest area,
   h) completely detaching the fillet flesh from said crest of the breastbone.

2. A method as claimed in claim 1, wherein before steps a) to h) are carried out, said skin is removed.

3. An apparatus for mechanically gaining fillet flesh from the bodies of slaughtered poultry, said poultry body defining a longitudinal axis and an exterior sectional contour and having a skeletal portion and skin and fillet flesh parts lying on and being connected to said skeletal portion, said skeletal portion essentially comprising a breastbone (sternum) including a crest (crista sterni) and a breastbone plate (corpus sterni), and defining a frontal area and inner surface, coracoids, each defining two ends and being attached to said breastbone plate at one of said ends, and wing joints and wishbone (clavicula) carried on said other ends of said coracoids, and possibly the remains of the ribs attached to said breastbone plate, said fillet flesh parts including an inner fillet portion which has wing tendons running through it, and comprising connecting skin connecting said inner fillet portion to said breastbone, said apparatus including:

conveying means defining a path of movement and having at least one supporting element, said at least one supporting element being equipped with a saddle surface for supporting said inner surface of the breastbone of said poultry body and with controllable clamping means for securing said poultry body; and processing sections for carrying out processing steps each including processing tools arranged along the path of said conveying means; and control means for time and spatial control of the processing steps, said processing sections comprising:
   a) first processing tool means for lifting the flesh parts lying on said breastbone plate in the region of attachment of the ribs and on any rib remains,
   b) second processing tools means for detaching the flesh parts lying on said coracoids in the region between said wing joints and the points of attachment of said coracoids to said breastbone plate by detaching said wing tendons running through said inner fillet portion as well as loosening flesh parts lying on said breastbone plate by continuing the seperation process of said first tool means up to the vicinity of said crest of the breastbone,
   c) third processing tool means for separating the connection between the flesh and said skeletal portion in the region of attachment of said wishbone to said coracoids,
   d) fourth processing tool means for lifting the flesh parts lying on said breastbone plate in a valley region formed between said breastbone plate and said by continuing the separation process of said second tool means in the region of said breastbone,
   e) fifth processing tool means for loosening the flesh parts lying on said wishbone,
   f) sixth processing tool means for cutting into said connecting skin connecting said inner fillet portion to said breastbone,
   g) seventh processing tool means for separating the fillet flesh from said breastbone in said frontal area and neighbouring crest area,
   h) eighth processing tool means for completely detaching the fillet flesh from said crest of the breastbone.

4. An apparatus as claimed in claim 3, wherein said first processing tool means comprises a pair of first tool parts arranged mirror inverted with respect to one another, each said first tool part having a first scraping means which is curved in shape such that it corresponds to the exterior sectional contour of the part of the skeletal portion to be processed in this section and is controlled to be held in a working position relative to said path of movement while said skeletal portion to be processed part passes by.

5. An apparatus as claimed in claim 3 wherein said second processing tool means comprises a pair of second tool parts, arranged mirror inverted with respect to each other, each said second tool part having second scraping means with a functional portion, said functional portions extending essentially in a plane which is tangential to the surface of said coracoids and in which said second scraping means is controlled to move into a working position relative to said path of movement directly after said wing joints have passed by.

6. An apparatus as claimed in claims 3, wherein said third processing tool means comprises a pair of third tool parts arranged mirror inverted with respect to one another and provided in the form of deflectors for forcing flesh parts outwards, each said deflector defining a point which is directed against the direction of movement of said conveying means, each said point being arranged immediately adjacent the path of said wishbone and being provided with laterally projecting stop means for retaining said flesh parts forced outwards by said deflector.

7. An apparatus as claimed in claim 6, wherein first guide means arranged on either side of the path of said conveying means extend as far as the region of said deflector and stop means and whereby said wishbone is guided between said first guide means and said ends of said coracoids carrying the wing joints are supported on said first guide means.

8. An apparatus as claimed in claim 7, wherein said first guide means are provided as a pair of rod-shaped members arranged symetrically with respect to said conveying means.

9. An apparatus as claimed in claim 6, wherein second guide means are provided as second guide rods, on which each said deflector is formed, said second guide rods having inner flanks and a diagonally cut end face and extending essentially parallel to said conveying means path, said deflector point being formed by an extension of the inner flank of each said second guide rod.

10. An apparatus as claimed in claim 8, wherein second guide means are provided as second guide rods, on which each said deflector is formed, said second guide rods having inner flanks and a diagonally cut end face and extending essentially parallel to said conveying means path, said deflector point being formed by an extension of the inner flank of each said second guide rod.

11. An apparatus as claimed in claim 3, wherein said fourth processing tool means comprises a pair of fourth tool parts, arranged mirror inverted with respect to one another, each said fourth tool part having third scraping means with functional portions which extend essentially in a plane which lies at a tangent to the surface of said breastbone plate, and in which plane said third scraping means are controlled to move into said conveying path of the poultry body directly before the arrival of said breastbone and to be held in said path while said breastbone passes by, said third scraping means disposing frontal ends with spacing therebetween to allow the passage of said crest of the breastbone and being arranged perpendicular to said conveying path and resiliently yielding with respect to said path.

12. An apparatus as claimed in claim 11, which further comprises a cam drive and a conveying means drive, said cam drive being synchronized with said conveying means drive and wherein said fourth tool parts are arranged to be pivotable and the movement of said tool parts is controlled by means of said cam drive.

13. An apparatus as claimed in claim 3, wherein said fifth processing tool means comprises at least one scraping blade being controlled to move into a position across said conveying path directly before the arrival of a said poultry body and to move out of said position directly before the arrival of said breastbone, said scraping blade being provided with a scraping edge, which extends transverse to said path at a height above a supporting surface defined by said supporting element which essentially corresponds to the level of the point of attachment of said wishbone to said coracoids.

14. An apparatus as claimed in claim 13, which further comprises a cam drive and a conveying means drive, said cam drive being synchronized with said conveying means drive and wherein said fifth tool parts are arranged to be pivotable and the movement of said tool parts is controlled by means of said cam drive.

15. An apparatus as claimed in claim 3, wherein said sixth processing tool means comprises a pair of knife blades arranged mirror inverted such-that they shear with one another when positioned in a shearing region above said conveying means, said knife blades being controlled to move into the shearing position before the arrival of said poultry body and to be retainable in this position until shortly after said breastbone crest enters the shearing region.

16. An apparatus as claimed in claim 15, which further comprises a cam drive and a conveying means drive, said cam drive being synchronized with said conveying means drive and wherein said sixth tool parts are arranged to be pivotable and the movement of said tool parts is controlled by means of said cam drive.

17. An apparatus claimed in claim 15 wherein said knife blades comprise cutting edges which are arranged with respect to one another such that they form scissor means, said cutting edges comprising a leading part from which they extend essentially in a direction against the direction of movement the conveying means and diverge therefrom.

18. An apparatus claimed in claim 3, wherein said seventh processing tool means comprises at least one stop element which is held in a position in a plane directly over said conveying path of said poultry body and across said path and is controlled to move out of this position shortly after the arrival of said breastbone crest.

19. An apparatus as claimed in claim 18, which further comprises a cam drive and a conveying means drive, said cam drive being synchronized with said conveying means drive and wherein said seventh tool parts are arranged to be pivotable and the movement of said tool parts is controlled by means of said cam drive.

20. An apparatus as claimed in claim 18, wherein said at least one stop element is arranged to be height adjustable.

21. An apparatus as claimed in claim 20, which further comprises a cam drive and a conveying means drive, said cam drive being synchronized with said conveying means drive and wherein said seventh tool parts are arranged to be pivotable and the movement of said tool parts is controlled by means of said cam drive.

22. An apparatus as claimed in claim 3, wherein said eighth processing tool means comprises a stripper roller which is rotatably driven about an axis extending transverse to the poultry body conveying path and comprises a guide groove for guiding said breastbone crest, said guide groove defining flanks, whereby said stripper roller rotates in a sense opposing the direction of movement of the conveying means and is disposed such that said breastbone crest is guided in said guide groove.

23. An apparatus as claimed in claim 22 wherein a deflection roller is arranged associated with said stripper roller, said deflection roller being driven in the same rotational sense as said stripper roller and defining a radial ridge guided by said guide groove.

24. An apparatus as claimed in claim 22 wherein said flanks of said guide groove are formed to be non-skid.

25. An apparatus as claimed in claims 24 wherein a deflection roller is arranged associated with said stripper roller, said deflection roller being driven in the same rotational sense as said stripper roller and defining a radial ridge guided by said guide groove.

26. An apparatus as claimed in claim 3, wherein processing tool means for skinning arranged upstream of said first processing section, said skinning tools comprising at least one pair of skinning rollers each rotating in an opposite sense, and provided with a non-skid surface, said skinning rollers forming a clamping slit extending centrally above and along said conveying path, said skinning rollers being controlled to move into contact with said skin of said poultry body.

27. An apparatus as claimed in claim 3, wherein said conveying means define an upper and a lower run and said first to eighth processing tool means are arranged along said lower run.

* * * * *